United States Patent
Zhang et al.

(10) Patent No.: US 8,792,370 B2
(45) Date of Patent: Jul. 29, 2014

(54) CARRIER PRECONFIGURATION FOR PDCCH MONITORING IN MULTI-CARRIER SYSTEMS

(75) Inventors: Xiaoxia Zhang, San Diego, CA (US); Tao Luo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 569 days.

(21) Appl. No.: 13/100,647

(22) Filed: May 4, 2011

(65) Prior Publication Data

US 2011/0273992 A1    Nov. 10, 2011

Related U.S. Application Data

(60) Provisional application No. 61/331,806, filed on May 5, 2010.

(51) Int. Cl.
*H04W 28/00* (2009.01)

(52) U.S. Cl.
USPC .......................................... 370/252; 370/330

(58) Field of Classification Search
USPC .................................. 370/252, 330
See application file for complete search history.

(56) References Cited

U.S. PATENT DOCUMENTS

2010/0118720 A1* 5/2010 Gauvreau et al. ............. 370/252

OTHER PUBLICATIONS

R1-092115, 'Resource Allocation and Downlink Control Channel Structure for Relay Backhaul Link', LG Electronics, 3GPP TSG RAN WG1 Meeting #57, May 4-8, 2009, pp. 1-7.*
R1-092683, 'Carrier Identification in PDCCH', ITRI, 3GPP TSG RAN WG1 Meeting #57bis, Jun. 29-Jul. 3, 2009, pp. 1-3.*
R1-093531, 'Issues on cross carrier scheduling', CATT, 3GPP TSG RAN WG1 meeting #58, Aug. 24-28, 2009, pp. 1-3.*
Huawei: "LTE non-CA based HetNet support", 3GPP Draft; R1-101982, 3rd Generation Partnership Project (3GPP), Mobile Competence Centre ; 650, Route des Lucioles ; F-06921 Sophia-Antipolis Cedex ; France, vol. RAN WG1, No. Beijing, china; 20100412, Apr. 6, 2010, XP050419319, [retrieved on Apr. 6, 2010].
International Search Report and Written Opinion—PCT/US2011/035405—ISA/EPO—Oct. 28, 2011.
NEC Group: "PDCCH Structure for LTE-Advanced System", 3GPP Draft; R1-091692 PDCCH Structure for LTE-Advanced System, 3rd Generation Partnership Project (3GPP), Mobile Competence Centre; 650, Route des Lucioles; F-06921 Sophia-Antipolis Cedex; France, No. San Francisco, USA; 20090428, Apr. 28, 2009, XP050339231, [retrieved on Apr. 28, 2009].
NTT Docomo: "PUCCH Design for Carrier Aggregation in LTE-Advanced", 3GPP Draft; R1-094238 PUCCH, 3rd Generation Partnership Project (3GPP), Mobile Competence Centre ; 650, Route des Lucioles ; F-06921 Sophia-Antipolis Cedex ; France, No. Miyazaki; 20091012, Oct. 12, 2009, XP050388702, [retrieved on Oct. 6, 2009].
Texas Instruments: "Issues on Carrier Aggregation for Advanced E-UTRA", 3GPP Draft, R1-090280 TI Carrier AGGR, 3rd Generation Partnership Project (3GPP), Mobile Competence Centre, 650, Route des Lucioles, F-06921 Sophia-Antipolis Cedex, France, No. Ljubljana, 20090107, Jan. 7, 2009, XP050318205, [retrieved on Jan. 7, 2009].

* cited by examiner

*Primary Examiner* — Melvin Marcelo
(74) *Attorney, Agent, or Firm* — Paul Kuo

(57) ABSTRACT

Certain aspects of the present disclosure relate to techniques for carrier preconfiguration for monitoring for transmissions of downlink control information (DCI), for example, conveyed in physical downlink control channel (PDCCH) transmissions utilizing multiple carriers. The methods and apparatuses described herein may be applied in both frequency division duplex (FDD) and time division duplex (TDD) systems.

68 Claims, 11 Drawing Sheets

CARRIER PRECONFIGURATION FOR PDCCH MONITORING IN MULTI-CARRIER SYSTEMS

CLAIM OF PRIORITY UNDER 35 U.S.C. §119

The present Application for Patent claims priority to U.S. Provisional Application No. 61/331,806, entitled, "CARRIER PRECONFIGURATION FOR PDCCH MONITORING IN MULTI-CARRIER TRANSMISSION FOR BOTH FDD AND TDD SYSTEMS," filed May 5, 2010, and assigned to the assignee hereof and hereby expressly incorporated by reference herein.

TECHNICAL FIELD

Certain aspects of the present disclosure generally relate to wireless communications and, more particularly, to monitoring for downlink control information (DCI) in multi-carrier systems.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include Code Division Multiple Access (CDMA) systems, Time Division Multiple Access (TDMA) systems, Frequency Division Multiple Access (FDMA) systems, $3^{rd}$ Generation Partnership Project (3GPP) Long Term Evolution (LTE) systems, and Orthogonal Frequency Division Multiple Access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output, multiple-input single-output or a multiple-input multiple-output (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports a time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

SUMMARY

Certain aspects of the present disclosure provide a method for wireless communications. The method generally includes determining a preconfiguration indicating which, of a plurality of component carriers, are used to transmit downlink control channel information (DCI) to at least one user equipment (UE) in predetermined subframes, signaling the preconfiguration to the UE, and transmitting DCI to the UE in the predetermined subframes, utilizing one or more component carriers in accordance with the preconfiguration.

Certain aspects of the present disclosure provide a method for wireless communications. The method generally includes receiving a preconfiguration indicating which, of a plurality of component carriers, are to be used by an eNodeB to transmit downlink control channel information (DCI) in predetermined subframes and monitoring for DCI transmitted in the predetermined subframes, utilizing one or more component carriers in accordance with the preconfiguration.

Certain aspects of the present disclosure provide an apparatus. The apparatus generally includes means for determining a preconfiguration indicating which, of one or more component carriers, are used to transmit downlink control channel information (DCI) to at least one user equipment (UE) in predetermined subframes, signaling the preconfiguration to the UE, and transmitting DCI to the UE in the predetermined subframes, utilizing one or more component carriers in accordance with the preconfiguration.

Certain aspects of the present disclosure provide an apparatus. The apparatus generally includes means for receiving a preconfiguration indicating which, of a plurality of component carriers, are to be used by an eNodeB to transmit downlink control channel information (DCI) in predetermined subframes and means for monitoring for DCI transmitted in the predetermined subframes, utilizing one or more component carriers in accordance with the preconfiguration.

Certain aspects of the present disclosure provide an apparatus. The apparatus generally includes at least one processor configured to determine a preconfiguration indicating which, of one or more component carriers, are used to transmit downlink control channel information (DCI) to at least one user equipment (UE) in predetermined subframes, signal the preconfiguration to the UE, and transmit DCI to the UE in the predetermined subframes, utilizing one or more component carriers in accordance with the preconfiguration; and a memory coupled with the at least on processor.

Certain aspects of the present disclosure provide an apparatus. The apparatus generally includes at least one processor configured to receive a preconfiguration indicating which, of a plurality of component carriers, are to be used by an eNodeB to transmit downlink control channel information (DCI) in predetermined subframes and means for monitoring for DCI transmitted in the predetermined subframes, utilize one or more component carriers in accordance with the preconfiguration; and a memory coupled with the at least one processor.

Certain aspects of the present disclosure provide a computer program product comprising a computer-readable storage medium having instructions stored thereon. The instructions generally executable by one or more processors for determining a preconfiguration indicating which, of one or more component carriers, are used to transmit downlink control channel information (DCI) to at least one user equipment (UE) in predetermined subframes, signaling the preconfiguration to the UE, and transmitting DCI to the UE in the predetermined subframes, utilizing one or more component carriers in accordance with the preconfiguration.

Certain aspects of the present disclosure provide computer program product comprising a computer-readable storage medium having instructions stored thereon. The instructions generally executable by one or more processors for receiving a preconfiguration indicating which, of a plurality of component carriers, are to be used by an eNodeB to transmit downlink control channel information (DCI) in predetermined subframes and monitoring for DCI transmitted in the predetermined subframes, utilizing one or more component carriers in accordance with the preconfiguration

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Figure 1:
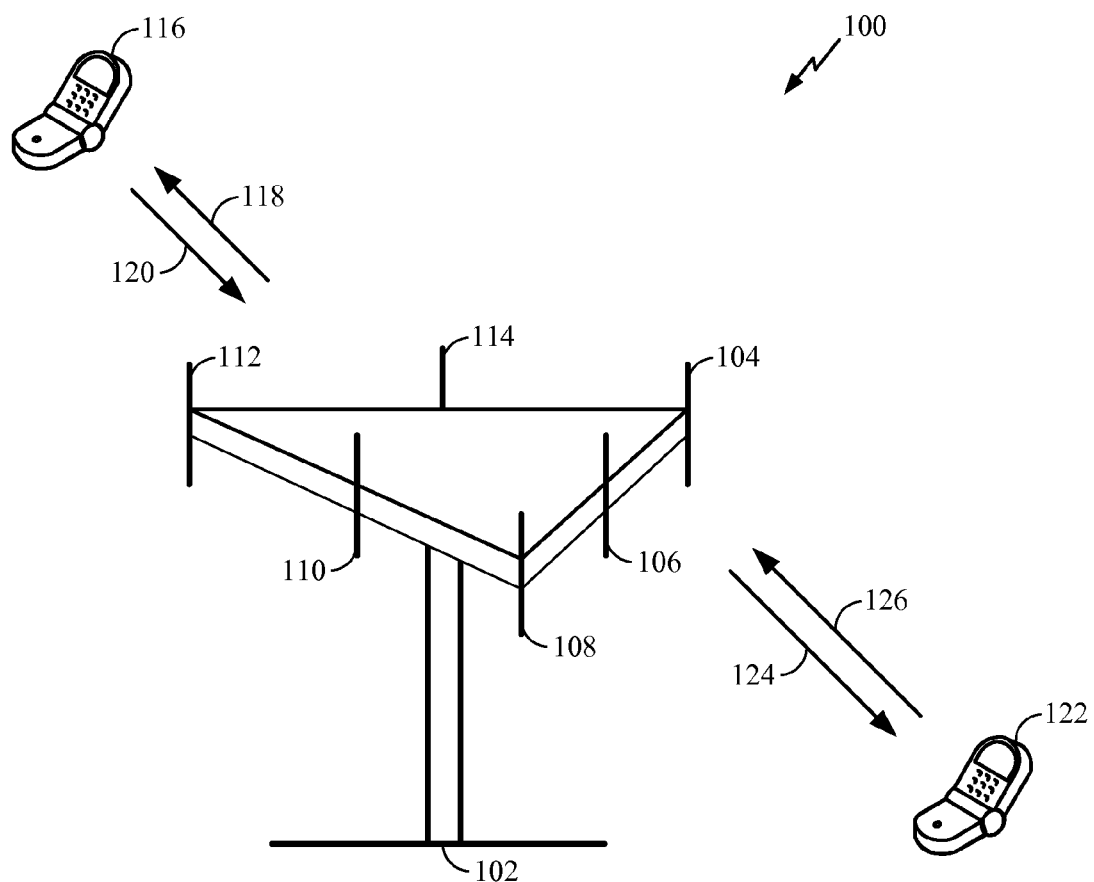
FIG. 1 illustrates an example multiple access wireless communication system in accordance with certain aspects of the present disclosure.

Certain aspects of the present disclosure provide techniques that may be utilized to help limit the amount of processing a user equipment (UE) does to detect and obtain downlink control information. According to certain aspects, a preconfiguarion indicating which, of a plurality of component carriers, are used to transmit downlink control channel information (DCI) to at least one user equipment (UE) in predetermined subframes may be shared between a eNodeB and the UE. DCI is a message carried by a PDCCH. It includes control information such as resource assignments for a UE or a group of UEs. The control information sent on each PDCCH may convey one or more downlink grants, one or more uplink grants, power control information, and/or other information. A downlink grant may carry control information for data transmission on the downlink. An uplink grant may carry control information for data transmission on the uplink. A grant may be sent to a specific UE or a group of UEs. A grant may also be referred to as an assignment. A UE may be configured to listen to one or more instances of the PDCCH. The UE may rely on this configuration to limit the number of search spaces it monitors for blind decoding of messages (e.g., physical downlink control channel-PDCCH messages) carrying DCI.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Wireless Communication System

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2).

Single carrier frequency division multiple access (SC-FDMA) is a transmission technique that utilizes single carrier modulation at a transmitter side and frequency domain equalization at a receiver side. The SC-FDMA has similar performance and essentially the same overall complexity as those of OFDMA system. However, SC-FDMA signal has lower peak-to-average power ratio (PAPR) because of its inherent single carrier structure. The SC-FDMA has drawn great attention, especially in the uplink communications where lower PAPR greatly benefits the mobile terminal in terms of transmit power efficiency. It is currently a working assumption for uplink multiple access scheme in the 3GPP LTE and the Evolved UTRA.

An access point ("AP") may comprise, be implemented as, or known as NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

An access terminal ("AT") may comprise, be implemented as, or known as an access terminal, a subscriber station, a subscriber unit, a mobile station, a remote station, a remote terminal, a user terminal, a user agent, a user device, user equipment, a user station, or some other terminology. In some implementations an access terminal may comprise a cellular telephone, a cordless telephone, a Session Initiation Protocol ("SIP") phone, a wireless local loop ("WLL") station, a personal digital assistant ("PDA"), a handheld device having wireless connection capability, a Station ("STA"), or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music or video device, or a satellite radio), a global positioning system device, or any other suitable device that is configured to communicate via a wireless or wired medium. In some aspects the node is a wireless node. Such wireless node may provide, for example, connectivity for or to a network (e.g., a wide area network such as the Internet or a cellular network) via a wired or wireless communication link.

Referring to FIG. 1, a multiple access wireless communication system according to one aspect is illustrated. An access point 100 (AP) may include multiple antenna groups, one group including antennas 104 and 106, another group including antennas 108 and 110, and an additional group including antennas 112 and 114. In FIG. 1, only two antennas are shown for each antenna group, however, more or fewer antennas may be utilized for each antenna group. Access terminal 116 (AT) may be in communication with antennas 112 and 114, where antennas 112 and 114 transmit information to access terminal 116 over forward link 120 and receive information from access terminal 116 over reverse link 118. Access terminal 122 may be in communication with antennas 106 and 108, where antennas 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency then that used by reverse link 118.

Each group of antennas and/or the area in which they are designed to communicate is often referred to as a sector of the access point. In one aspect of the present disclosure each antenna group may be designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals 116 and 124. Also, an access point using beamforming to transmit to access terminals scattered randomly through its coverage causes less interference to access terminals in neighboring cells than an access point transmitting through a single antenna to all its access terminals.

Figure 2:
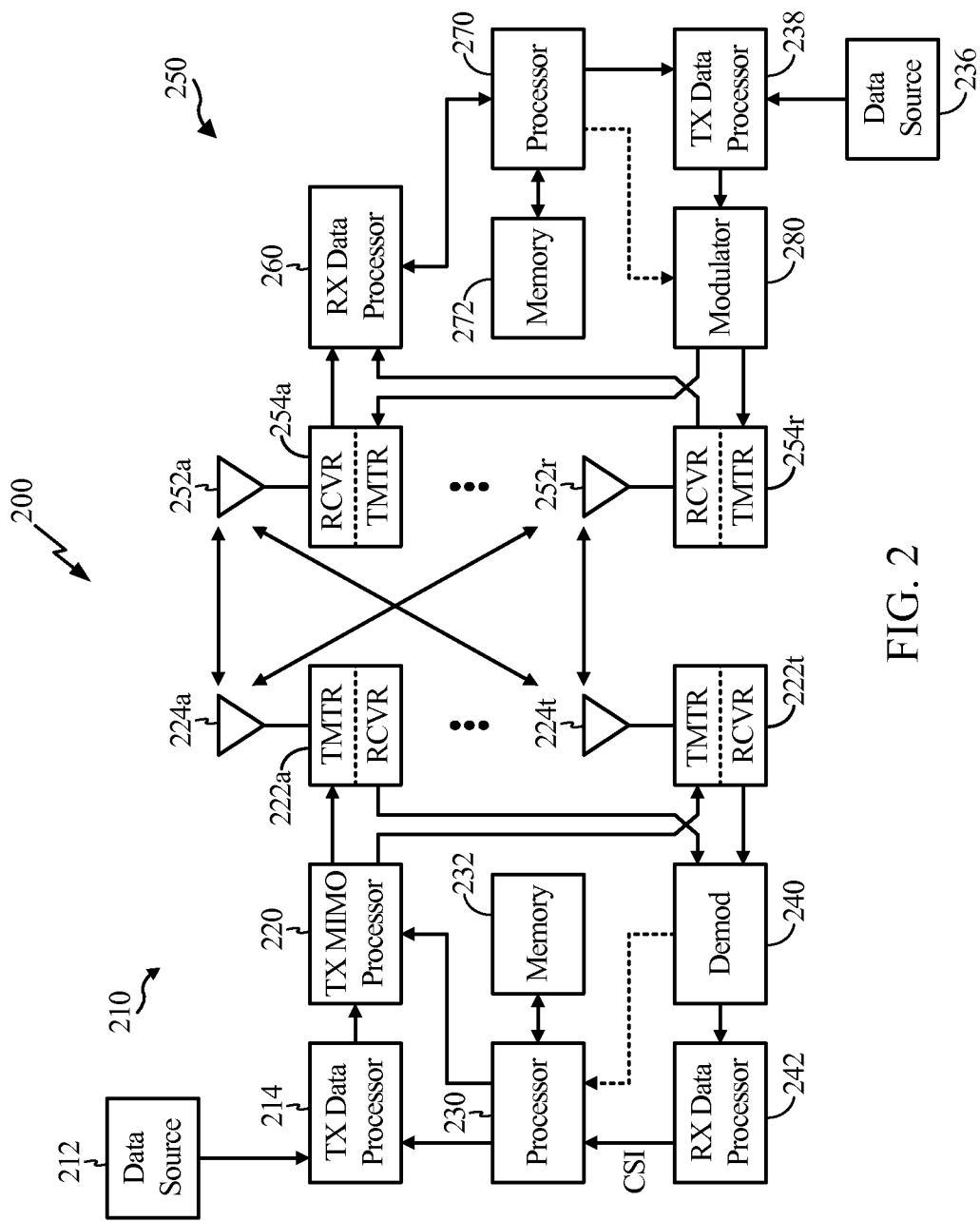
FIG. 2 illustrates a block diagram of an access point and a user terminal in accordance with certain aspects of the present disclosure.

FIG. 2 illustrates a block diagram of an aspect of a transmitter system 210 (also known as the access point) and a receiver system 250 (also known as the access terminal) in a multiple-input multiple-output (MIMO) system 200. At the transmitter system 210, traffic data for a number of data streams is provided from a data source 212 to a transmit (TX) data processor 214.

In one aspect of the present disclosure, each data stream may be transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions stored in memory 232 and performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain aspects of the present disclosure, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals may be received by $N_R$ antennas 252a through 252r and the received signal from each antenna 252 may be provided to a respective receiver (RCVR) 254a through 254r. Each receiver 254 may condition (e.g., filters, amplifies, and downconverts) a respective received signal, digitize the conditioned signal to provide samples, and further process the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 may be complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion using instructions stored in memory 272. The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights, and then processes the extracted message.

In one aspect of the present disclosure, logical wireless communication channels may be classified into control channels and traffic channels. Logical control channels may comprise a Broadcast Control Channel (BCCH) which is a downlink (DL) channel for broadcasting system control information. A Paging Control Channel (PCCH) is a DL logical control channel that transfers paging information. A Multicast Control Channel (MCCH) is a point-to-multipoint DL logical control channel used for transmitting Multimedia Broadcast and Multicast Service (MBMS) scheduling and control information for one or several Multicast Traffic Channels (MTCHs). Generally, after establishing Radio Resource Control (RRC) connection, the MCCH may be only used by user terminals that receive MBMS. A Dedicated Control Channel (DCCH) is a point-to-point bi-directional logical control channel that transmits dedicated control information and it is used by user terminals having an RRC connection. Logical traffic channels may comprise a Dedicated Traffic Channel (DTCH) which is a point-to-point bi-directional channel dedicated to one user terminal for transferring user information. Furthermore, logical traffic channels may comprise a Multicast Traffic Channel (MTCH), which is a point-to-multipoint DL channel for transmitting traffic data.

Transport channels may be classified into DL and UL channels. DL transport channels may comprise a Broadcast Channel (BCH), a Downlink Shared Data Channel (DL-SDCH) and a Paging Channel (PCH). The PCH may be utilized for supporting power saving at the user terminal (i.e., Discontinuous Reception (DRX) cycle may be indicated to the user terminal by the network), broadcasted over entire cell and mapped to physical layer (PHY) resources which can be used for other control/traffic channels. The UL transport channels may comprise a Random Access Channel (RACH), a Request Channel (REQCH), an Uplink Shared Data Channel (UL-SDCH) and a plurality of PHY channels.

The PHY channels may comprise a set of DL channels and UL channels. The DL PHY channels may comprise: Common Pilot Channel (CPICH), Synchronization Channel (SCH), Common Control Channel (CCCH), Shared DL Control Channel (SDCCH), Multicast Control Channel (MCCH), Shared UL Assignment Channel (SUACH), Acknowledgement Channel (ACKCH), DL Physical Shared Data Channel (DL-PSDCH), UL Power Control Channel (UPCCH), Paging Indicator Channel (PICH), and Load Indicator Channel (LICH). The UL PHY Channels may comprise: Physical Random Access Channel (PRACH), Channel Quality Indicator Channel (CQICH), Acknowledgement Channel (ACKCH), Antenna Subset Indicator Channel (ASICH), Shared Request Channel (SREQCH), UL Physical Shared Data Channel (UL-PSDCH), and Broadband Pilot Channel (BPICH).

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

Figure 3:
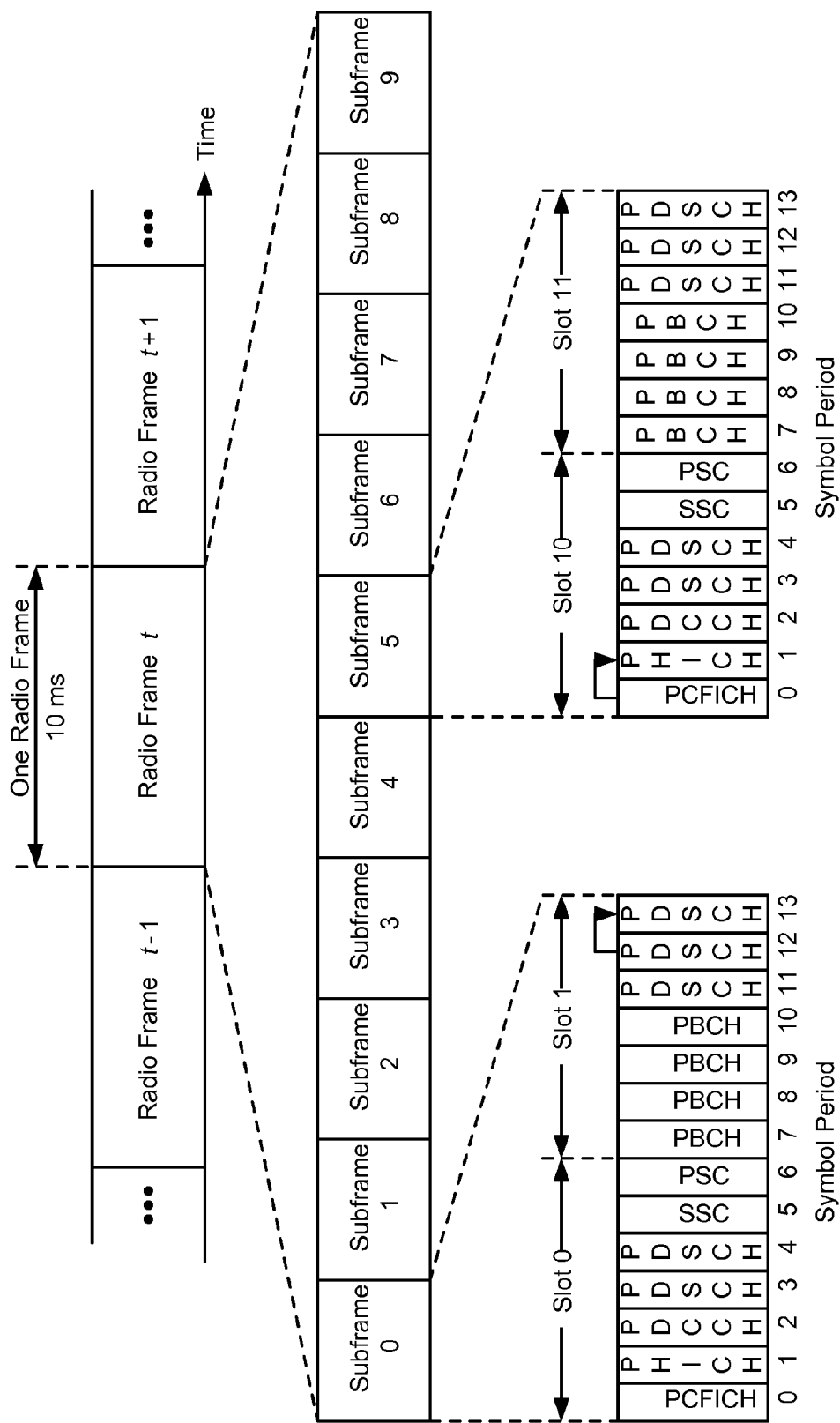
FIG. 3 is a block diagram conceptually illustrating an example of a down link frame structure in a telecommunications system.

FIG. 3 shows an example down link frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 3) or 14 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSS) and a secondary synchronization signal (SSS) for each cell in the eNodeB. The primary and secondary synchronization signals may be sent in symbol periods 6 and 5, respectively, in each of subframes 0 and 5 of each radio frame with the normal cyclic prefix, as shown in FIG. 3. The synchronization signals may be used by UEs for cell detection and acquisition. The eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in only a portion of the first symbol period of each subframe, although depicted in the entire first symbol period in FIG. 3. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 3, M=3. The eNodeB may send a Physical HARQ Indicator Channel (PHICH) and a Physical Downlink Control Channel (PDCCH) in the first M symbol periods of each subframe (M=3 in FIG. 3). The PHICH may carry information to support hybrid automatic retransmission (HARQ). The PDCCH may carry information on uplink and downlink resource allocation for UEs and power control information for uplink channels. Although not shown in the first symbol period in FIG. 3, it is understood that the PDCCH and PHICH are also included in the first symbol period. Similarly, the PHICH and PDCCH are also both in the second and third symbol periods, although not shown that way in FIG. 3. The eNodeB may send a Physical Downlink Shared Channel (PDSCH) in the remaining symbol periods of each subframe. The PDSCH may carry data for UEs scheduled for data transmission on the downlink. The various signals and channels in LTE are described in 3GPP TS 36.211, entitled "Evolved Universal Terrestrial Radio Access (E-UTRA); Physical Channels and Modulation," which is publicly available.

The eNodeB may send the PSS, SSS and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to specific UEs in specific portions of the system bandwidth. The eNodeB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Carrier Aggregation

LTE-Advanced UEs use spectrum up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Carrier Aggregation Types

Figure 4A:
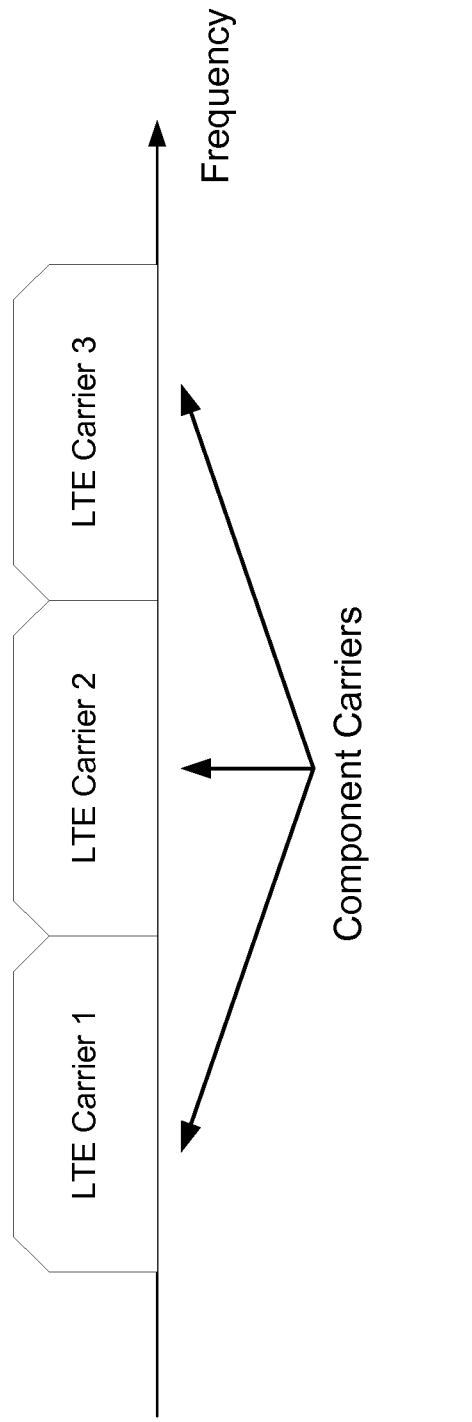
FIG. 4A discloses a continuous carrier aggregation type.
Figure 4B:
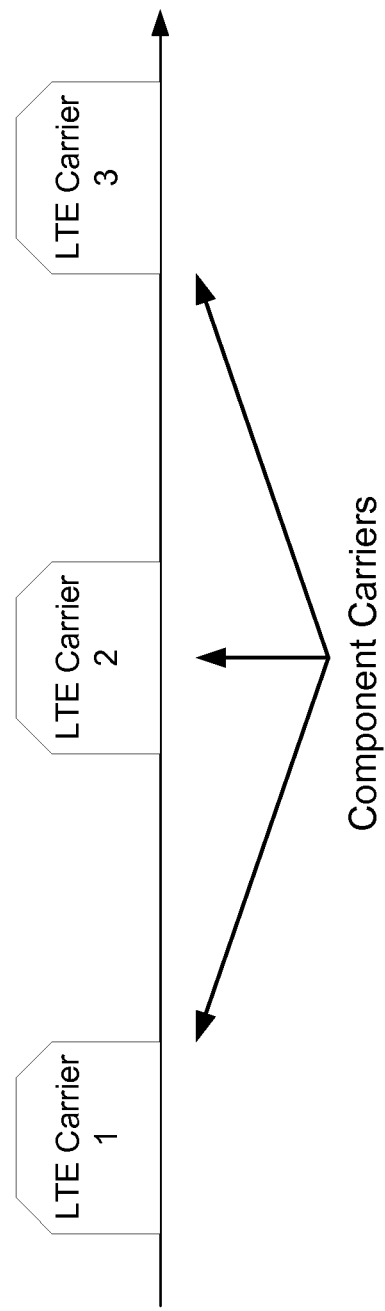
FIG. 4B discloses a non-continuous carrier aggregation type.

For the LTE-Advanced mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Data Aggregation Schemes

Figure 5:
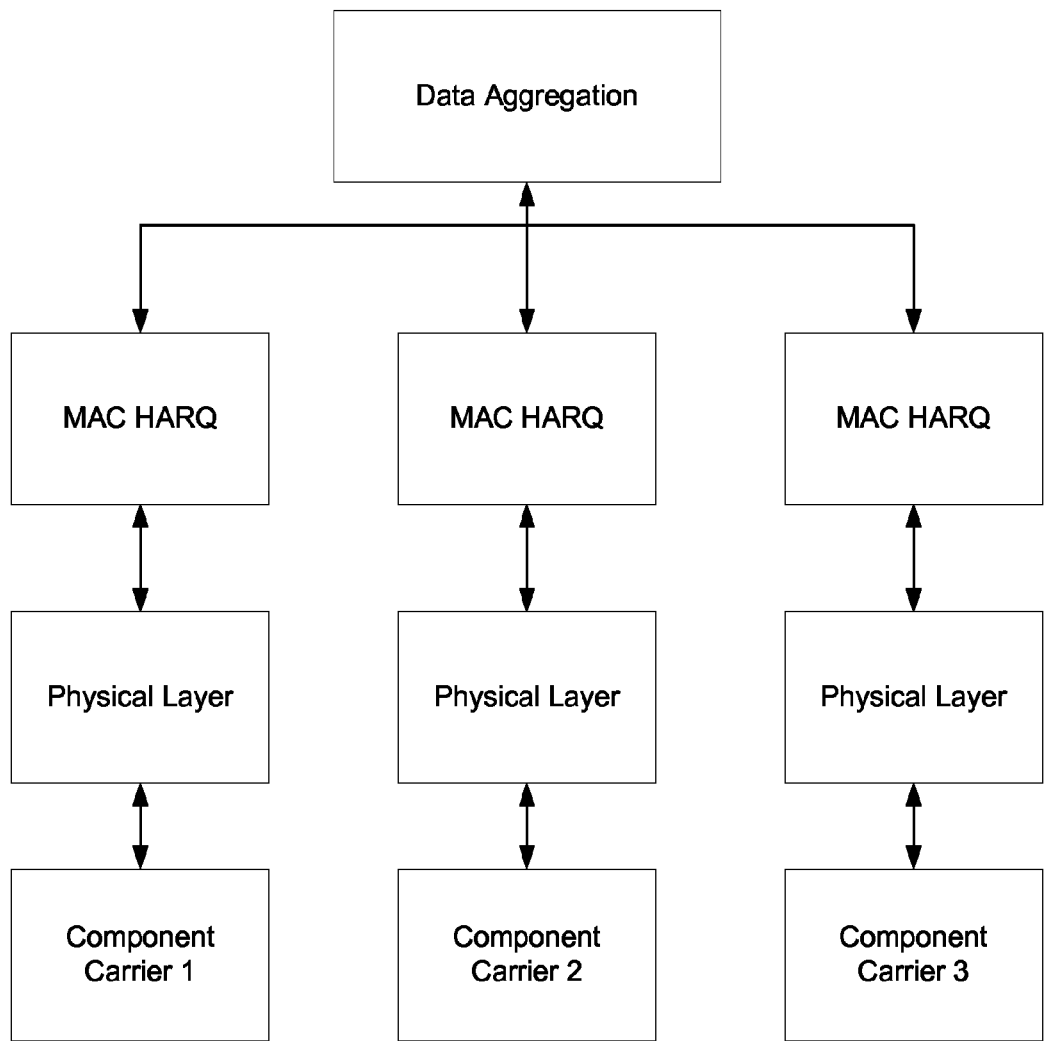
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced UE. However, reserving sufficient system resources (i.e., component carriers with good transmission quality) for the incoming UE with specific CA configurations and quality of service (QoS) requirements may be challenging for the next eNodeB. The reason is that the channel conditions of two (or more) adjacent cells (eNodeBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

According to various embodiments, the UE operating in a multicarrier system (also referred to as carrier aggregation) is configured to aggregate certain functions of multiple carriers, such as control and feedback functions, on the same carrier, which may be referred to as a "primary carrier." The remaining carriers that depend on the primary carrier for support are referred to as associated secondary carriers. For example, the UE may aggregate control functions such as those provided by the optional dedicated channel (DCH), the nonscheduled grants, a physical uplink control channel (PUCCH), and/or a physical downlink control channel (PDCCH). Signaling and payload may be transmitted both on the downlink by the eNode B to the UE, and on the uplink by the UE to the eNode B.

In some embodiments, there may be multiple primary carriers. In addition, secondary carriers may be added or removed without affecting the basic operation of the UE, including physical channel establishment and RLF procedures which are layer 2 procedures, such as in the 3GPP technical specification 36.331 for the LTE RRC protocol.

Figure 6:
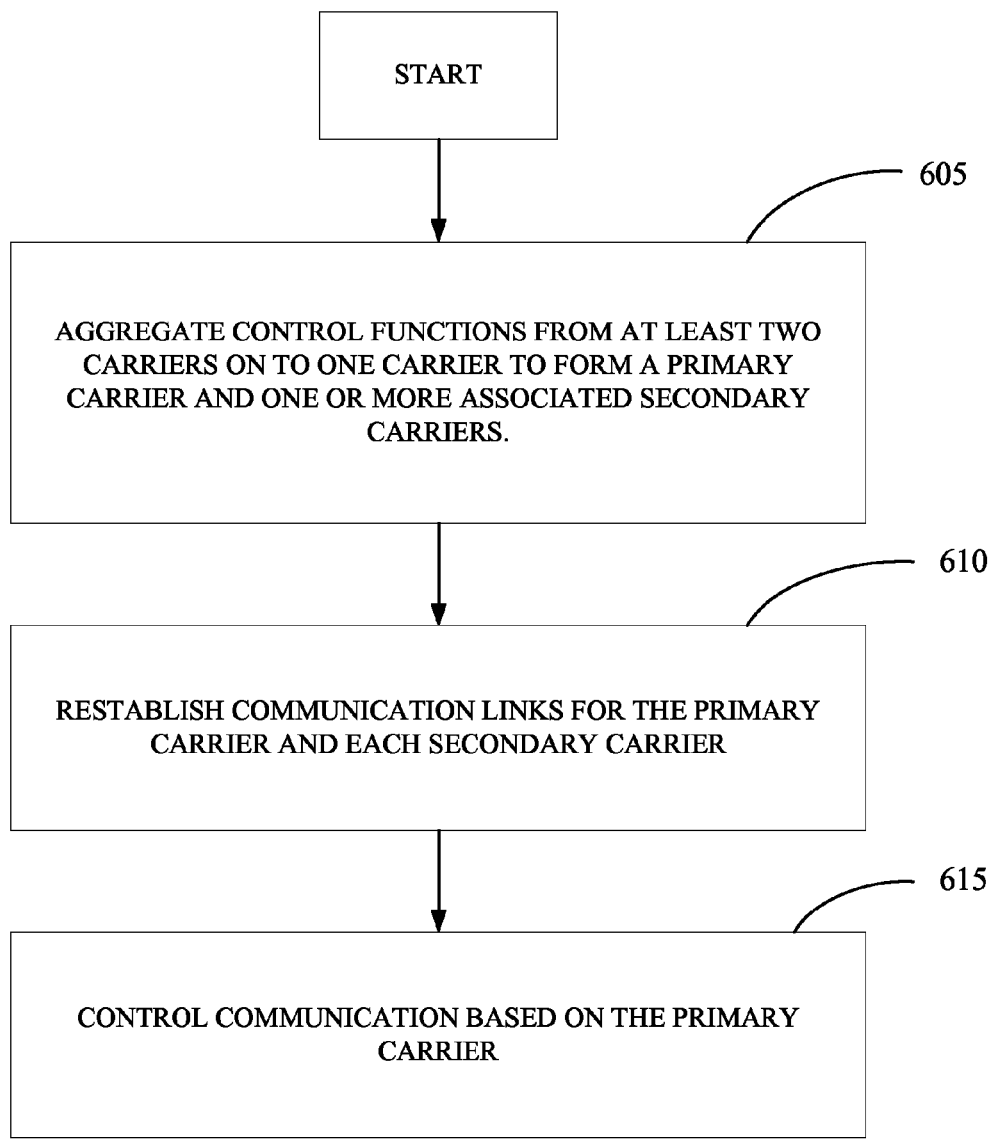
FIG. 6 is a block diagram illustrating a method for controlling radio links in multiple carrier configurations.

FIG. 6 illustrates a method 600 for controlling radio links in a multiple carrier wireless communication system by grouping physical channels according to one example. As shown, the method includes, at block 605, aggregating control functions from at least two carriers onto one carrier to form a primary carrier and one or more associated secondary carriers. Next at block, 610, communication links are established for the primary carrier and each secondary carrier. Then, communication is controlled based on the primary carrier in block 615.

Carrier Preconfiguration for PDCCH Monitoring in Multi-Carrier Transmission

One approach to increase the peak rate of wireless systems (such as in LTE-A) is to utilize a multi-carrier system with carrier aggregation. In such a system, a base station (or eNodeB) may send downlink transmissions (e.g., PDCCH and PDSCH transmissions) utilizing multiple carriers. In some cases, cross-carrier assignment may be implemented, meaning a PDCCH on a first carrier (e.g., CC1) may carry control information (e.g., assignments) for a second carrier (e.g., CC2). In some cases, the first carrier may be considered a primary component carrier (or anchor carrier), and carry assignments for both carriers.

In some cases, cross-carrier signaling may be performed on a DL with single-carrier signaling on UL, or cross-carrier signaling may be on UL with single-carrier signaling on DL. Further, the number of component carriers used for UL and DL may be the same or may differ between UL and DL.

When cross-carrier signaling is utilized, various techniques may be utilized to differentiate DCI intended for different component carriers. For example, some type of component indicator may be embedded in the control signaling information fields or via different cyclic redundancy check (CRC) scrambling (e.g., via different radio network temporary identifiers (RNTIs) for different component carriers).

To detect and decode DCI, a UE needs to perform a search for PDCCH candidates. Table 1 below shows the number of PDCCH candidates for UE-specific and common search spaces based on the aggregation level. In LTE Release 8 (Rel-8), each UE monitors both the common search space and a UE-specific search space in a control region. A search space may comprise a set of CCE locations where a UE may find its PDCCHs. Nine sets of four physical resource elements known as resource element groups (REGs) make up each CCE. The PDCCH candidates are transmitted using a number of the CCEs. All UEs are aware of the common search space, while the dedicated search space is configured for an individual UE. As illustrated in Table 1, the max number of PDCCH candidates that a UE attempts to decode in a subframe is 6 in the common search space (4 for control channel element (CCE) aggregation level 4 and 2 for CCE aggregation level 8) and 16 in the UE-specific search space (6, 6, 2, and 2 for CCE aggregation levels 1, 2, 4, and 8, respectively). To find its PDCCH, the UE monitors a set of PDCCH candidates in every subframe.

TABLE 1

PDCCH SEARCH SPACE

| Type | Search Space Aggregation Level | Size in CCEs | Number of PDCCH Candidates |
| --- | --- | --- | --- |
| UE-specific | 1 | 6 | 6 |
| | 2 | 12 | 6 |
| | 4 | 8 | 2 |
| | 8 | 16 | 2 |
| Common | 4 | 16 | 4 |
| | 8 | 16 | 2 |

When multiple carriers are involved, in one subframe, UEs may need to search for various control information, such as physical downlink control channel (PDCCH), coming from multiple carriers. This applies to both cross-carrier assignments and nominal assignments (an assignment for a transmission on the same component carrier).

As a result, the PDCCH search space may get crowded and the search complexity gets much higher for cross-carrier assignment where control region in one subframe may accommodate multiple CC search spaces. Such a problem is even more exacerbated in time division duplex (TDD) systems where UE needs to search PDCCH for multiple downlink (DL) subframes even in single carrier systems since more DL subframes are present than the uplink (UL) subframes in most UL-DL configurations.

For example, with TDD UL-DL configuration 1, subframes are configured as: DSUUD-DSUUD (where D designates a DL subframe, U designates an UL subframe, and S designates a special subframe used for guard time). In this configuration, a single subframe may be used to acknowledge downlink transmissions received on multiple subframes. For example, subframe 2 may be used to acknowledge PDSCH transmissions sent in subframes 5 and 6, while subframe 7 may be used to acknowledge PDSCH transmissions sent in subframes 0 and 1. With multiple downlink subframes needing to be acknowledged in the same uplink subframe, multiple PDSCH assignments may be transmitted in the same subframe (e.g., cross-subframe assignment).

Unfortunately, this increases the number of PDCCHs a UE needs to search for in a given subframe. This problem is made worse in multi-carrier systems, as a UE may need to search multiple carriers. Assuming the example above, with 5 carriers, a UE may need to search within a single subframe for two PDCCHs (assigning PDSCHs in different subframes) and search 5 carriers.

According to certain aspects of the present disclosure, in an effort to alleviate such a problem, the carrier may be preconfigured for PDCCH transmission and for UE monitoring grants. According to certain aspects of the present disclosure, certain carriers may be preconfigured to send PDCCH/PDSCH on certain subframes.

Such a preconfiguration may address cross-subframe assignment, as well as cross-carrier assignment. For example, different subframes may have different number of search spaces that the UE monitors in case of cross-carrier assignment. According to certain aspects, the set of search spaces can vary from subframe to subframe for nominal PDCCH assignment (the same carrier assignment) or cross-carrier assignment. It may be noted that such preconfiguration can be UE specific and signaled, for example, via radio resource control (RRC) signaling.

A UE may utilize such knowledge of the preconfiguration when performing blind decoding for PDCCH. According to certain aspects, a UE may also use some preconfiguration information when sending UL acknowledged/not acknowledged (ACK/NAK) for a corresponding PDSCH.

Figure 7:
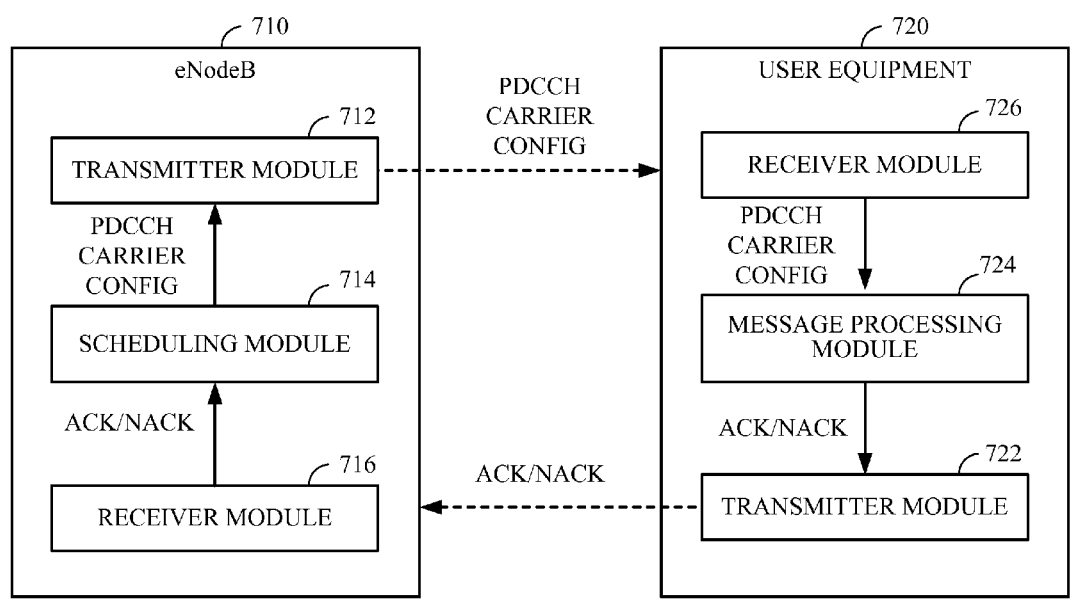
FIG. 7 illustrates a block diagram conceptually illustrating an operation of an eNodeB with a user equipment, in accordance with certain aspects of the present disclosure.

FIG. 7 illustrates an example wireless system 700 with an eNodeB 710 and UE 720 capable for performing operations described herein. According to certain aspects, another type of device, such as a relay node, may be configured to utilize preconfiguration information and, thus, may perform operations such as those described with reference to the UE 720. In other cases, a relay node communicating with a UE may perform operations similar to those described with reference to the BS 710. In some cases, the same relay node may perform both types of operations (e.g., acting as a UE when communicating with the eNodeB and acting as the eNodeB when communicating with the UE).

According to certain aspects, the eNodeB 710 may include a scheduling module 714. The scheduling module 714 may be generally configured to determine a preconfiguration indicating which, of a plurality of component carriers the eNodeB 710 uses to communicate with the UE 720, are used to transmit downlink control channel information (DCI) to at least one user equipment (UE) in predetermined subframes. As illustrated, this information may be provided to a transmitter module 712, to be transmitted to the UE 720. According to certain aspects, the carrier configuration information may be signaled via RRC signaling.

The UE 720 may receive the carrier configuration information, via a receiver module 726, and provide the information to a message processing module 724. The message processing module may utilize the carrier configuration information, for example, to determine one or more search spaces when performing blind decodes for PDCCH messages. According to certain aspects, the UE 720 may also utilize the carrier configuration information when sending uplink ACK/NACKs for PDSCHs. For example, the UE 720 may send ACK/NACKs (via a transmitter module 722) only on a preconfigured component carrier on which an assignment for the PDSCH was received.

The eNodeB 710 may receive, via a receiver module 716, the ACK/NACK transmission from the UE 720 and update the scheduling module 714 accordingly. As noted above, the eNodeB 710 may look for ACK/NACKs on the same component carrier used to schedule a corresponding PDSCH transmission.

Figure 8:
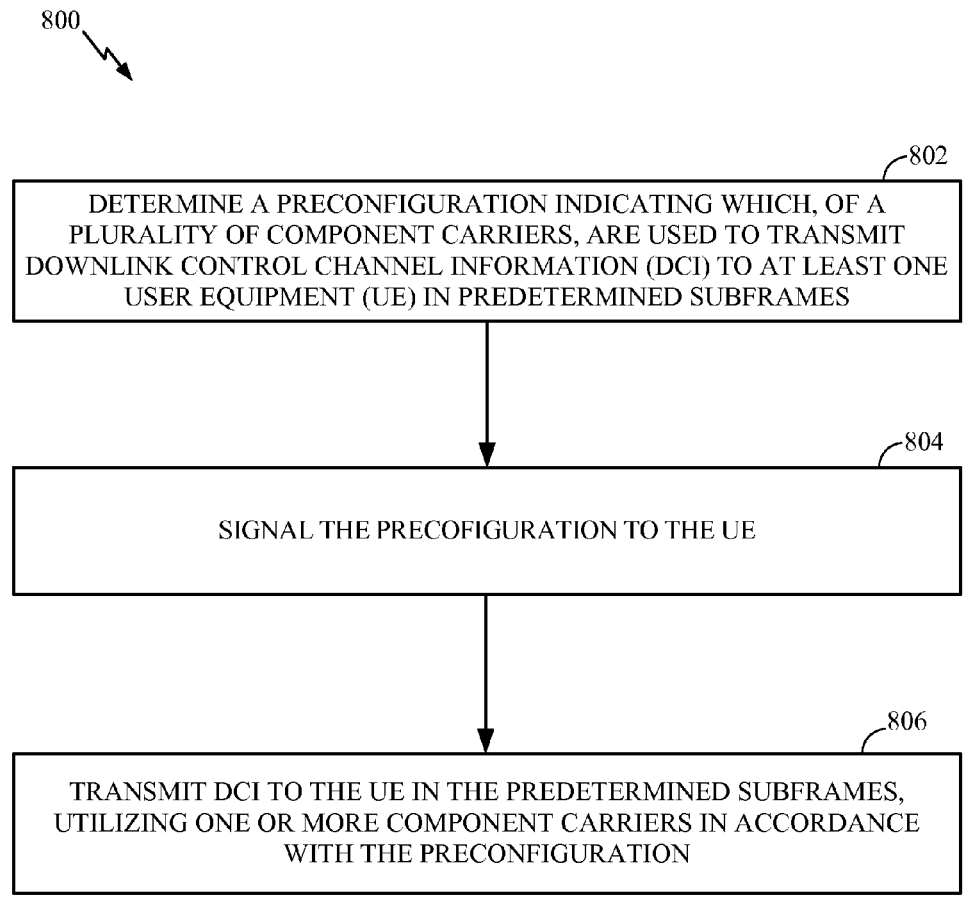
FIG. 8 illustrates an example operation that may be performed by an eNodeB in accordance with certain aspects of the present disclosure.

FIG. 8 illustrates example operations 800 that may be performed, for example, by a base station, such as eNodeB 710 of FIG. 7.

The operations 800 begin, at 802, by determining a preconfiguration indicating which, of a plurality of component carriers, are used to transmit downlink control channel information (DCI) to at least one user equipment (UE) in predetermined subframes. The operations continue, at 804, by signaling the preconfiguration to the UE and, at 806, by transmitting DCI to the UE in the predetermined subframes, utilizing one or more component carriers in accordance with the preconfiguration.

Figure 9:
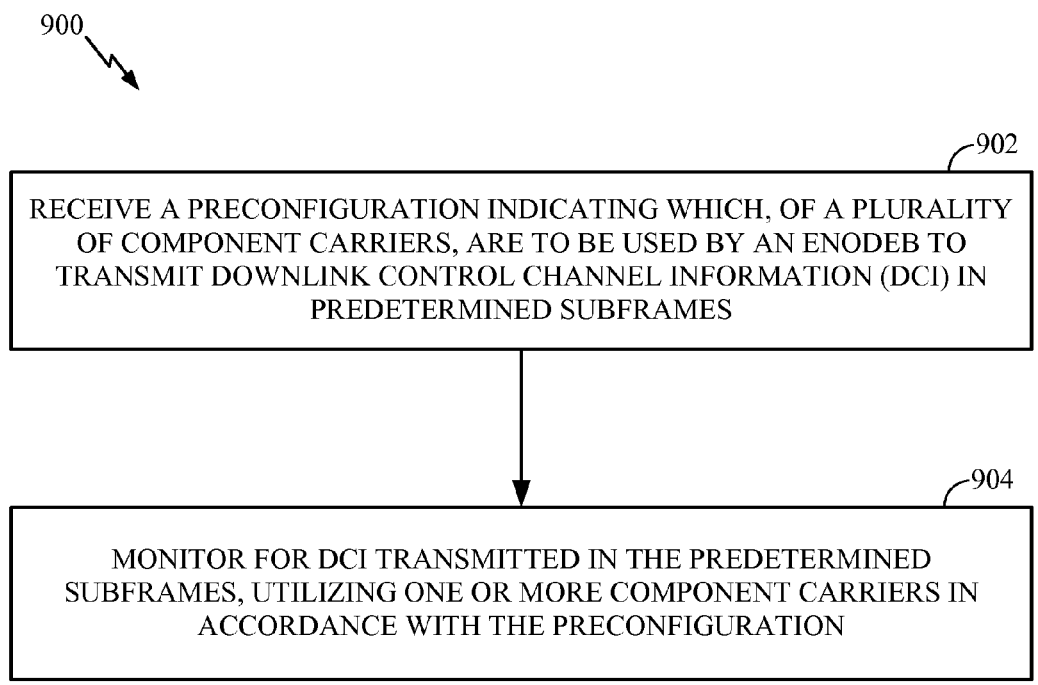
FIG. 9 illustrates an example operation that may be performed by a user equipment in accordance with certain aspects of the present disclosure.

FIG. 9 illustrates example operations 900 that may be performed, for example, by a UE, such as UE 720 of FIG. 7.

The operations 900 begin, at 902, by receiving a preconfiguration indicating which, of a plurality of component carriers, are to be used by a eNodeB to transmit downlink control channel information (DCI) in predetermined subframes. The operations continue, at 904, by monitoring for DCI transmitted in the predetermined subframes, utilizing one or more component carriers in accordance with the preconfiguration.

As noted above, the carrier configuration information may indicate, to the UE, which component carriers are used to transmit downlink control information in different subframes. For example, assuming a system with 4 component carriers (CC1, CC2, CC3, and CC4), CC1 and CC2 may be configured to transmit DCI in a first set of subframes while CC3 and CC4 may be configured to transmit DCI in a second set of subframes.

Figure 10A:
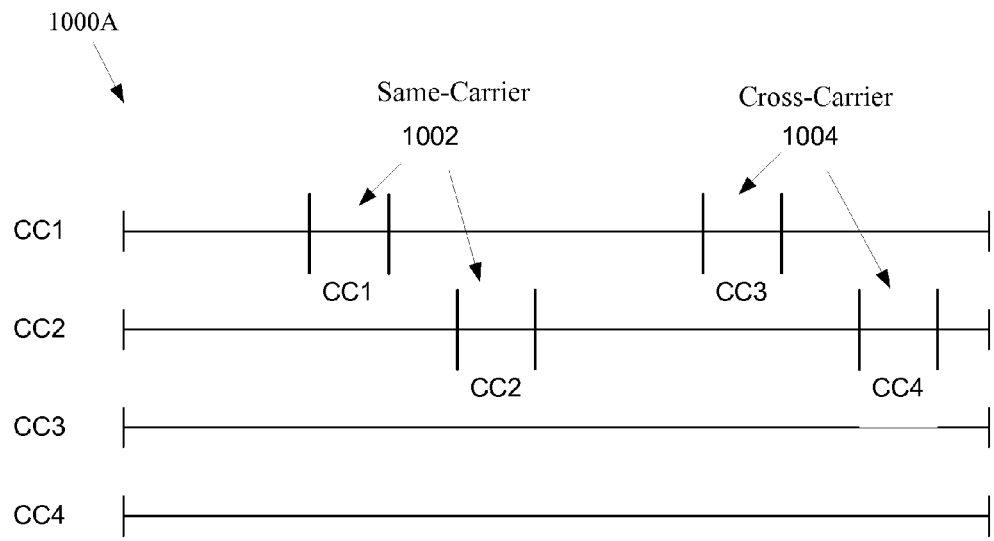
FIGS. 10A and 10B illustrates example preconfigurations of component carriers to carry downlink control information (DCI), in accordance with certain aspects of the present disclosure.
Figure 10B:
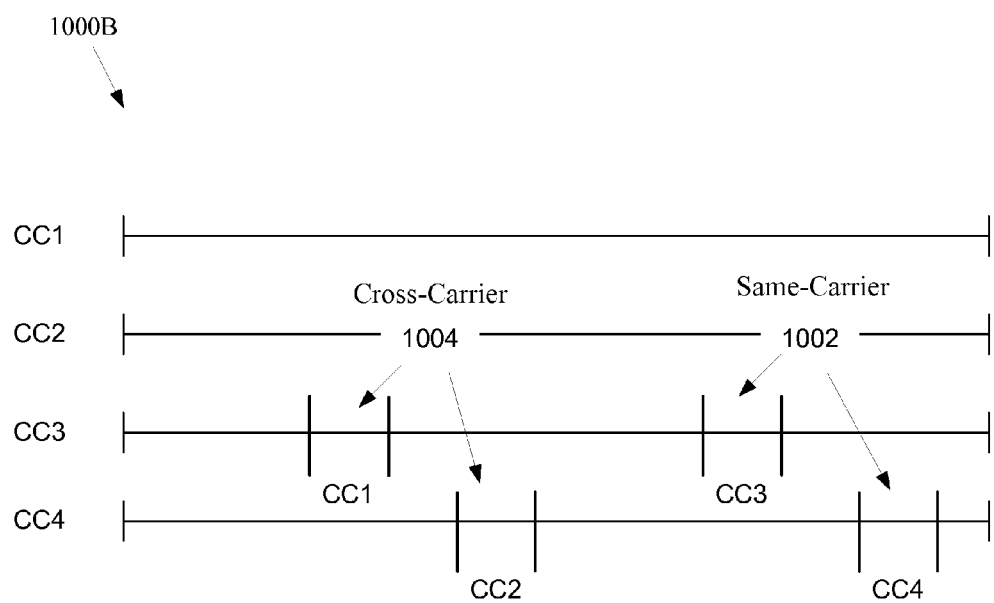

This example is illustrated in FIGS. 10A and 10B. As illustrated in FIG. 10A, for a first set of subframes, CC1 may be configured to scheduling PDSCH for both CC1 (same carrier assignment) and CC3 (cross-carrier assignment). Thus, a UE with this information may know to search, for this set of subframes, two different search spaces for CC1 (same-carrier assignment search space 1002 and cross-carrier search space 1004). Similarly, CC2 may be configured to schedule PDSCH for CC2 and CC4 for this set of subframes. Thus, for this set of subframes, the UE may also search two different search spaces for CC2.

Note that, in this example, CC3 and CC4 may not be configured to schedule PDSCH on any component carriers for the first set of subframes. However, CC3 and CC4 may be configured to schedule PDSCH on any component carriers for a second set of subframes, while CC1 and CC2 are not used.

For example, as illustrated in FIG. 10B, for a second set of subframes, CC3 may be configured to schedule PDSCH for both CC3 (same carrier assignment) and CC1 (cross-carrier assignment). Thus, a UE with this information may know to search, for this set of subframes, two different search spaces for CC3 (same-carrier assignment search space 1002 and cross-carrier search space 1004). Similarly, CC4 may be configured to schedule PDSCH for CC4 and CC2 for this set of subframes. Thus, for this set of subframes, the UE may also search two different search spaces for CC4.

Exactly how the subframes are divided into different sets may vary for different implementations. According to certain aspects, an effort may be made to evenly distribute scheduling load. For example, for an FDD system (with UL and DL resources in each subframe), CC1 and CC2 may be preconfigured to schedule PDSCH on even subframes, while CC3 and CC4 may be configured to schedule PDSCH on even subframes. As another example, for TDD systems, CC1 and CC2 may be pre-configured to schedule PDSCH on a first set of DL subframes (e.g., subframes 0/4/5 for configuration 1), while CC3 and CC4 may be configured to schedule PDSCH on a second set of DL subframes (e.g., 1/6/9 for configuration 1).

As noted above, the preconfiguration may also be applied to scheduling acknowledgements. For example, when a UE sends UL transmissions to acknowledge PDSCH transmissions, it may only send ACK/NAK for the preconfigured carriers. The preconfigured carriers for ACK/NACK may be the same as those used for assignment of the corresponding PDSCH being acknowledged or may be preconfigured in some other manner. In any case, limiting the ACK/NACK to preconfigured carriers may help reduce the overall ACK/NAK payload (e.g., which may be limited to 10 bits for a TDD system).

According to certain aspects, preconfiguration may also be applied to a control channel sent in a data region. For example, in some cases a control channel, such as a relay physical downlink control channel (R-PDCCH) for a relay node may be transmitted within a data region of a PDSCH. The preconfiguration described herein may be applied to determine resources used to assign the PDSCH and/or the R-PDDCH within the data region of the PDSCH transmission.

The various operations of methods described above may be performed by any suitable means capable of performing the corresponding functions. The means may include various hardware and/or software component(s) and/or module(s), including, but not limited to a circuit, an application specific integrate circuit (ASIC), or processor.

The various operations of methods described above may be performed by any suitable means capable of performing the corresponding functions. The means may include various hardware and/or software component(s) and/or module(s), including, but not limited to a circuit, an application specific integrate circuit (ASIC), or processor. The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of transmission medium.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

What is claimed is:

1. A method for wireless communications, comprising:
   determining a preconfiguration indicating which, of one or more component carriers, are used to transmit downlink control channel information (DCI) to at least one user equipment (UE) in a certain predetermined set of subframes;
   signaling the preconfiguration to the UE; and
   transmitting DCI to the UE in the certain predetermined set of subframes, utilizing one or more component carriers in accordance with the preconfiguration.

2. The method of claim 1, wherein the downlink control channel information is transmitted in physical downlink control channel (PDCCH) messages.

3. The method of claim 2, wherein at least one of the PDCCH messages comprises a cross-subframe assignment of a physical downlink shared channel (PDSCH) to be transmitted in a subframe subsequent to a subframe in which the PDCCH message is transmitted.

4. The method of claim 2, wherein none of the PDCCH messages comprises a cross-subframe assignment of a physical downlink shared channel (PDSCH) to be transmitted in a subframe subsequent to a subframe in which the PDCCH message is transmitted.

5. The method of claim 2, wherein at least one of the PDCCH messages comprises a cross-carrier assignment of a physical downlink shared channel (PDSCH) to be transmitted using a component carrier different than a component carrier used to transmit the PDCCH message.

6. The method of claim 2, wherein at least one PDCCH is transmitted in a data region of a physical downlink shared channel (PDSCH).

7. The method of claim 2, wherein none of the PDCCH messages is transmitted in a data region of a physical downlink shared data channel (PDSCH).

8. The method of claim 1, wherein the preconfiguration indicates that:
   a first one or more component carriers are preconfigured to transmit DCI in a first set of subframes; and
   a second one or more component carriers are preconfigured to transmit DCI in a second set of subframes.

9. The method of claim 8, wherein:
   the subframes are transmitted according to a frequency division duplex (FDD) transmission scheme;
   the first set of subframes comprises even subframes; and
   the second set of subframes comprises odd subframes.

10. The method of claim 8, wherein:
    the subframes are transmitted according to a time division duplex (TDD) transmission scheme.

11. The method of claim 1, wherein the preconfiguration also indicates what component carriers should be used for acknowledging physical downlink shared channels (PDSCH) transmissions.

12. The method of claim 11, wherein the preconfiguration indicates that a same component carrier used to transmit an assignment of a PDSCH transmission should be used to transmit a corresponding acknowledgement.

13. A method for wireless communications, comprising:
    receiving a preconfiguration indicating which, of a plurality of component carriers, are to be used by an eNodeB to transmit downlink control channel information (DCI) in a certain predetermined set of subframes; and
    monitoring for DCI transmitted in the certain predetermined set of subframes, utilizing one or more component carriers in accordance with the preconfiguration.

14. The method of claim 13, wherein the downlink control channel information is transmitted in physical downlink control channel (PDCCH) messages.

15. The method of claim 14, wherein at least one of the PDCCH messages comprises a cross-subframe assignment of a physical downlink shared channel (PDSCH) to be transmitted in a subframe subsequent to a subframe in which the PDCCH message is transmitted.

16. The method of claim 14, wherein at least one of the PDCCH messages comprises a cross-carrier assignment of a physical downlink shared channel (PDSCH) to be transmitted using a component carrier different than a component carrier used to transmit the PDCCH message.

17. The method of claim 14, wherein at least one PDCCH is transmitted in a data region of a physical downlink shared channel (PDSCH).

18. The method of claim 13, wherein the preconfiguration indicates that:
    a first one or more component carriers are preconfigured to transmit DCI in a first set of subframes; and
    a second one or more component carriers are preconfigured to transmit DCI in a second set of subframes.

19. The method of claim 18, wherein:
    the subframes are transmitted according to a frequency division duplex (FDD) transmission scheme;
    the first set of subframes comprises even subframes; and
    the second set of subframes comprises odd subframes.

20. The method of claim 18, wherein:
    the subframes are transmitted according to a time division duplex (TDD) transmission scheme.

21. The method of claim 14, further comprising:
    detecting a PDCCH message received on a set of one or more configured component carriers; and
    transmitting uplink control information corresponding to the PDCCH message,
    wherein the transmitting is limited to the set of one or more configured component carriers.

22. The method of claim 21, wherein the preconfiguration indicates that a same component carrier used to transmit an assignment of a PDSCH transmission should be used to transmit a corresponding acknowledgement.

23. An apparatus for wireless communications, comprising:
    means for determining a preconfiguration indicating which, of one or more component carriers, are used to transmit downlink control channel information (DCI) to at least one user equipment (UE) in a certain predetermined set of subframes;
    means for signaling the preconfiguration to the UE; and
    means for transmitting DCI to the UE in the certain predetermined set of subframes, utilizing one or more component carriers in accordance with the preconfiguration.

24. The apparatus of claim 23, wherein the downlink control channel information is transmitted in physical downlink control channel (PDCCH) messages.

25. The apparatus of claim 24, wherein at least one of the PDCCH messages comprises a cross-subframe assignment of a physical downlink shared channel (PDSCH) to be transmitted in a subframe subsequent to a subframe in which the PDCCH message is transmitted.

26. The apparatus of claim 24, wherein none of the PDCCH messages comprises a cross-subframe assignment of a physical downlink shared channel (PDSCH) to be transmitted in a subframe subsequent to a subframe in which the PDCCH message is transmitted.

27. The apparatus of claim 24, wherein at least one of the PDCCH messages comprises a cross-carrier assignment of a physical downlink shared channel (PDSCH) to be transmitted using a component carrier different than a component carrier used to transmit the PDCCH message.

28. The apparatus of claim 24, wherein at least one PDCCH is transmitted in a data region of a physical shared data channel (PDSCH).

29. The apparatus of claim 24, wherein none of the PDCCH messages is transmitted in a data region of a physical downlink shared channel (PDSCH).

30. The apparatus of claim 23, wherein the preconfiguration indicates that:
a first one or more component carriers are preconfigured to transmit DCI in a first set of subframes; and
a second one or more component carriers are preconfigured to transmit DCI in a second set of subframes.

31. The apparatus of claim 30, wherein:
the subframes are transmitted according to a frequency division duplex (FDD) transmission scheme;
the first set of subframes comprises even subframes; and
the second set of subframes comprises odd subframes.

32. The apparatus of claim 30, wherein:
the subframes are transmitted according to a time division duplex (TDD) transmission scheme.

33. The apparatus of claim 23, wherein the preconfiguration also indicates what component carriers should be used for acknowledging physical downlink shared channels (PDSCH) transmissions.

34. The apparatus of claim 33, wherein the preconfiguration indicates that a same component carrier used to transmit an assignment of a PDSCH transmission should be used to transmit a corresponding acknowledgement.

35. An apparatus for wireless communications, comprising:
means for receiving a preconfiguration indicating which, of a plurality of component carriers, are to be used by an eNodeB to transmit downlink control channel information (DCI) in a certain predetermined set of subframes; and
means for monitoring for DCI transmitted in the a certain predetermined set of subframes, utilizing one or more component carriers in accordance with the preconfiguration.

36. The apparatus of claim 35, wherein the downlink control channel information is transmitted in physical downlink control channel (PDCCH) messages.

37. The apparatus of claim 36, wherein at least one of the PDCCH messages comprises a cross-subframe assignment of a physical downlink shared channel (PDSCH) to be transmitted in a subframe subsequent to a subframe in which the PDCCH message is transmitted.

38. The apparatus of claim 36, wherein at least one of the PDCCH messages comprises a cross-carrier assignment of a physical downlink shared channel (PDSCH) to be transmitted using a component carrier different than a component carrier used to transmit the PDCCH message.

39. The apparatus of claim 36, wherein at least one PDCCH is transmitted in a data region of a physical downlink shared channel (PDSCH).

40. The apparatus of claim 35, wherein the preconfiguration indicates that:
a first one or more component carriers are preconfigured to transmit DCI in a first set of subframes; and
a second one or more component carriers are preconfigured to transmit DCI in a second set of subframes.

41. The apparatus of claim 40, wherein:
the subframes are transmitted according to a frequency division duplex (FDD) transmission scheme;
the first set of subframes comprises even subframes; and
the second set of subframes comprises odd subframes.

42. The apparatus of claim 40, wherein:
the subframes are transmitted according to a time division duplex (TDD) transmission scheme.

43. The apparatus of claim 36, further comprising:
means for detecting a PDCCH message received on a set of one or more configured component carriers; and
means for transmitting uplink control information corresponding to the PDCCH message, wherein the transmitting is limited to the set of one or more configured component carriers.

44. The apparatus of claim 43, wherein the preconfiguration indicates that a same component carrier used to transmit an assignment of a PDSCH transmission should be used to transmit a corresponding acknowledgement.

45. An apparatus for wireless communications, comprising:
at least one processor configured to determine a preconfiguration indicating which, of one or more component carriers, are used to transmit downlink control channel information (DCI) to at least one user equipment (UE) in a certain predetermined set of subframes, signal the preconfiguration to the UE, and transmit DCI to the UE in the certain predetermined set of subframes, utilizing one or more component carriers in accordance with the preconfiguration; and
a memory coupled with the at least one processor.

46. The apparatus of claim 45, wherein the downlink control channel information is transmitted in physical downlink control channel (PDCCH) messages.

47. The apparatus of claim 46, wherein at least one of the PDCCH messages comprises a cross-subframe assignment of a physical downlink shared channel (PDSCH) to be transmitted in a subframe subsequent to a subframe in which the PDCCH message is transmitted.

48. The apparatus of claim 46, wherein none of the PDCCH messages comprises a cross-subframe assignment of a physical downlink shared channel (PDSCH) to be transmitted in a subframe subsequent to a subframe in which the PDCCH message is transmitted.

49. The apparatus of claim 46, wherein at least one of the PDCCH messages comprises a cross-carrier assignment of a physical downlink shared channel (PDSCH) to be transmitted using a component carrier different than a component carrier used to transmit the PDCCH message.

50. The apparatus of claim 46, wherein at least one PDCCH is transmitted in a data region of a physical downlink shared channel (PDSCH).

51. The apparatus of claim 46, wherein none of the PDCCH messages is transmitted in a data region of a physical downlink shared channel (PDSCH).

52. The apparatus of claim 45, wherein the preconfiguration indicates that:
a first one or more component carriers are preconfigured to transmit DCI in a first set of subframes; and
a second one or more component carriers are preconfigured to transmit DCI in a second set of subframes.

53. The apparatus of claim 52, wherein:
the subframes are transmitted according to a frequency division duplex (FDD) transmission scheme;
the first set of subframes comprises even subframes; and
the second set of subframes comprises odd subframes.

54. The apparatus of claim 52, wherein:
the subframes are transmitted according to a time division duplex (TDD) transmission scheme.

55. The apparatus of claim 45, wherein the preconfiguration also indicates what component carriers should be used for acknowledging physical downlink shared channels (PDSCH) transmissions.

56. The apparatus of claim 55, wherein the preconfiguration indicates that a same component carrier used to transmit an assignment of a PDSCH transmission should be used to transmit a corresponding acknowledgement.

57. An apparatus for wireless communications, comprising:
at least one processor configured to receive a preconfiguration indicating which, of a plurality of component carriers, are to be used by an eNodeB to transmit downlink control channel information (DCI) in a certain predetermined set of subframes and monitor for DCI transmitted in the certain predetermined set of subframes, utilizing one or more component carriers in accordance with the preconfiguration; and
a memory coupled with the at least one processor.

58. The apparatus of claim 57, wherein the downlink control channel information is transmitted in physical downlink control channel (PDCCH) messages.

59. The apparatus of claim 58, wherein at least one of the PDCCH messages comprises a cross-subframe assignment of a physical downlink shared channel (PDSCH) to be transmitted in a subframe subsequent to a subframe in which the PDCCH message is transmitted.

60. The apparatus of claim 58, wherein at least one of the PDCCH messages comprises a cross-carrier assignment of a physical downlink shared channel (PDSCH) to be transmitted using a component carrier different than a component carrier used to transmit the PDCCH message.

61. The apparatus of claim 58, wherein at least one PDCCH is transmitted in a data region of a physical downlink shared channel (PDSCH).

62. The apparatus of claim 57, wherein the preconfiguration indicates that:
a first one or more component carriers are preconfigured to transmit DCI in a first set of subframes; and
a second one or more component carriers are preconfigured to transmit DCI in a second set of subframes.

63. The apparatus of claim 62, wherein:
the subframes are transmitted according to a frequency division duplex (FDD) transmission scheme;
the first set of subframes comprises even subframes; and
the second set of subframes comprises odd subframes.

64. The apparatus of claim 62, wherein:
the subframes are transmitted according to a time division duplex (TDD) transmission scheme.

65. The apparatus of claim 58, wherein the at least one processor is further configured to:
detect a PDCCH message received on a set of one or more configured component carriers; and
transmit uplink control information corresponding to the PDCCH message,
wherein the transmitting is limited to the set of one or more configured component carriers.

66. The apparatus of claim 65, wherein the preconfiguration indicates that a same component carrier used to transmit an assignment of a PDSCH transmission should be used to transmit a corresponding acknowledgement.

67. A computer program product comprising a non-transitory computer-readable storage medium having instructions stored thereon, the instructions executable by one or more processors for:
determining a preconfiguration indicating which, of one or more component carriers, are used to transmit downlink control channel information (DCI) to at least one user equipment (UE) in a certain predetermined set of subframes;
signaling the preconfiguration to the UE; and
transmitting DCI to the UE in the certain predetermined set of subframes, utilizing one or more component carriers in accordance with the preconfiguration.

68. A computer program product comprising a non-transitory computer-readable storage medium having instructions stored thereon, the instructions executable by one or more processors for:
receiving a preconfiguration indicating which, of a plurality of component carriers, are to be used by an eNodeB to transmit downlink control channel information (DCI) in a certain predetermined set of subframes; and
monitoring for DCI transmitted in the certain predetermined set of subframes, utilizing one or more component carriers in accordance with the preconfiguration.

* * * * *